United States Patent

Ottenwaelder et al.

[11] Patent Number: 6,160,248
[45] Date of Patent: Dec. 12, 2000

[54] DEVICE FOR ELECTRO-INDUCTIVE HARDENING OF BEARING SURFACES AND TRANSITION RADII IN CRANKSHAFTS

[75] Inventors: Adalbert Ottenwaelder, Stimpfach; Harald Traub, Aalen, both of Germany

[73] Assignee: Maschinenfabrik Alfing Kessler GmbH, Aalen, Germany

[21] Appl. No.: 09/555,284

[22] PCT Filed: Nov. 22, 1998

[86] PCT No.: PCT/EP98/07503

§ 371 Date: May 26, 2000

§ 102(e) Date: May 26, 2000

[87] PCT Pub. No.: WO99/27143

PCT Pub. Date: Jun. 3, 1999

[30] Foreign Application Priority Data

Nov. 26, 1997 [DE] Germany .......................... 197 52 237

[51] Int. Cl.[7] .................... H05B 6/10; H05B 6/44
[52] U.S. Cl. .................... 219/639; 219/672; 219/673; 148/572; 266/129
[58] Field of Search .................... 219/639, 640, 219/635, 670, 672, 673, 676; 266/129; 148/567, 572, 573

[56] References Cited

U.S. PATENT DOCUMENTS

| | | | |
|---|---|---|---|
| 4,300,031 | 11/1981 | Reboux et al. | 219/673 |
| 5,157,231 | 10/1992 | Baeurele . | |
| 5,451,749 | 9/1995 | Griebel et al. | 219/639 |
| 5,495,094 | 2/1996 | Rowan et al. | 219/672 |

FOREIGN PATENT DOCUMENTS

| | | | |
|---|---|---|---|
| 29 32 438 | 2/1981 | Germany | 219/639 |
| 3613909 | 1/1987 | Germany . | |
| 3617468 | 1/1987 | Germany . | |
| 4001887 | 7/1991 | Germany . | |
| 4236921 | 9/1993 | Germany . | |
| 19530430 | 4/1996 | Germany . | |
| 2962283 U | 7/1997 | Germany . | |

*Primary Examiner*—Philip H. Leung
*Attorney, Agent, or Firm*—Sonnenschein Nath & Rosenthal

[57] ABSTRACT

The invention relates to a device for simultaneous peripheral electro-inductive hardening of bearing surfaces (2A, 3A) and transition A radii in crankshafts (1), comprising lifting pins (2, 3) arranged directly adjacent to each other and one behind the other with different angular positions on the plane perpendicular to the their axis of rotation (D), wherein inductors (8, 9) are provided which are placed on the lifting pins (2, 3) approximately in the same direction (C) thereof. A lifting pin (2, 3) is allocated to each inductor, which is arranged in such a way that it intersects the axial direction of the crankshaft (1). Said inductor comprises at least two inductor detents (8C, 8D, 9C, 9D) arranged parallel to each other. One inductor detent (8D, 9D) is arranged in an overlay area (4) of the lifting pins (2, 3) while the other inductor detent (8C, 9C) is arranged in an edge area of the lifting pin (2, 3) facing a cheek (5, 6). Said inductors are configured with a large inductor segment (8A, 9A) and a short inductor segment (8B, 9B) in such a way that the long inductor segment (8A, 9A) has a width (b_1) that is larger than half of the overall width (B) of the bearing surfaces (2A, 3A), wherein the long inductor segments (8A, 9A) are always separated by a space (E) in the peripheral direction of the crankshaft (1).

6 Claims, 4 Drawing Sheets

DEVICE FOR ELECTRO-INDUCTIVE HARDENING OF BEARING SURFACES AND TRANSITION RADII IN CRANKSHAFTS

The invention relates to a device for simultaneous peripheral electro-inductive hardening of bearing surfaces and transition radii on crankshafts, comprising lifting pins arranged directly adjacent to each other and one behind the other with different angular positions in the plane perpendicular to the axis of rotation of said crankshafts.

Such devices for electro-inductive hardening of so-called "split-pin crankshafts" which have lifting pins arranged directly adjacent to each other and offset are sufficiently known from practice in the automotive industry, it being endeavored with a number of known designs to harden the bearing surfaces of the directly adjacently arranged lifting pins of a crankshaft simultaneously with little mechanical expenditure and to obtain a desired grain structure.

For example, DE 36 13 309 discloses a method and a device for the inductive hardening of bearing surfaces and transition radii on "split-pin crankshafts", the bearing surfaces and transition radii of the lifting pins arranged directly one behind the other being simultaneously peripherally hardened by inductors which are arranged oppositely offset perpendicularly with respect to the axis of rotation of the crankshaft.

This solution offers the advantage that there is considerable space available for the configuration of the individual inductor and that mutual inductive influencing of the inductors is avoided. Furthermore, the lateral feeding of the inductors respectively reaching around the lifting pins in a half-shell shape permits maximum wrapping enclosure without the inductors touching during rotation of the crankshaft. With regard to their design, however, the opposite arrangement of the inductors requires relatively great expenditure.

DE 40 01 887 discloses an improved solution with a method and a device for hardening crankshafts, comprising pins separated from one another by webs, the inductors being brought into contact with the pins from the same side, said pins being narrower than the width of the hardening zone and the inductors being designed in a known way such that the surface region to be heated to hardening temperature is increased in comparison with the width of the inductor and the distance between the inductors is chosen such that the heating-up regions of neighboring inductors merge with one another.

With the feeding of the inductors from the same direction, preferably from above, this solution requires significantly lower mechanical expenditure for hardening. However, to avoid axial contact of the inductors in their region of radial overlap, the angle of wrap of the inductors must be chosen to be shorter than in the case of an opposite feeding of the inductors, which leads to disadvantages with regard to the efficiency of the hardening method and the depth of hardening to be achieved by it, in particular uniform hardening of radii.

This restriction also exists with a design of the inductors known from practice, with portions of different widths, an inductor portion that serves predominantly for radial hardening covering over half the bearing width and a second inductor portion being formed such that it is correspondingly narrower, to avoid a collision with the identically designed other inductor. Since the inductor portions in this set-back region are not effective on the inner radius, there remains, seen from the center of the lifting bearing pin, only a maximum effective angle of wrap of approximately 50°, with which prescribed hardening tolerances can often be maintained only with difficulty.

The present invention is therefore based on the object of providing a device of the type stated at the beginning which can be realized in terms of structural design in a simple and low-cost way and which permits increased efficiency while ensuring optimum hardening of bearing surfaces and radii.

This object is achieved according to the present invention.

With the device according to the invention, both the advantages of wrapping a long way around the lifting pins with regard to the hardening depth and the advantages of feeding the inductors from one direction with regard to reduced mechanical expenditure are achieved.

The arrangement according to the invention of the long inductor portions at a distance from one another in the peripheral direction allows the angle of wrap of the inductor in the overlapping region of the lifting pin periphery to be significantly lengthened, more energy being introduced during the same hardening time over the long and widened inductor portion with its correspondingly long heating path, in particular into the transition radii, as a result of which a great and uniform hardening depth is made possible there.

Inductors arranged according to the invention can be realized with a portion for the hardening of radii that is over twice as long as conventional inductors with inductor feeding from one direction, for which reason, with such a design, for example, a point on the periphery of the lifting pin is passed over in a certain time interval during n revolutions of the crankshaft n times, with twice the heating-up length.

To give the device according to the invention high efficiency, in a particularly advantageous design the long inductor portions may be arranged in such a way that they cover one of the upper quadrants of the lifting pin periphery through at least 60° and the adjoining lower quadrant through at least 30°, respectively wrapping around the lifting pin periphery preferably in an angular range of 120°.

Further advantageous designs and advantages of the device according to the invention emerge from the further subclaims and the exemplary embodiment described in principle below with reference to the drawing, in which:

In FIGS. 1 to 4, a crankshaft 1 is represented, comprising lifting pins 2, 3 arranged directly adjacent to each other and one behind the other with different angular positions in the plane perpendicular to the axis of rotation D of said crankshaft, which is also referred to as a "split-pin crankshaft".

The lifting pins 2, 3, arranged offset in relation to each other, each have bearing surfaces 2A, 3A, which on one side bound an overlapping region 4 between the lifting pins, with transition radii not represented any more specifically, and are bounded on the opposite side by a web 5 and 6, respectively, of the crankshaft 1.

Figure 2:
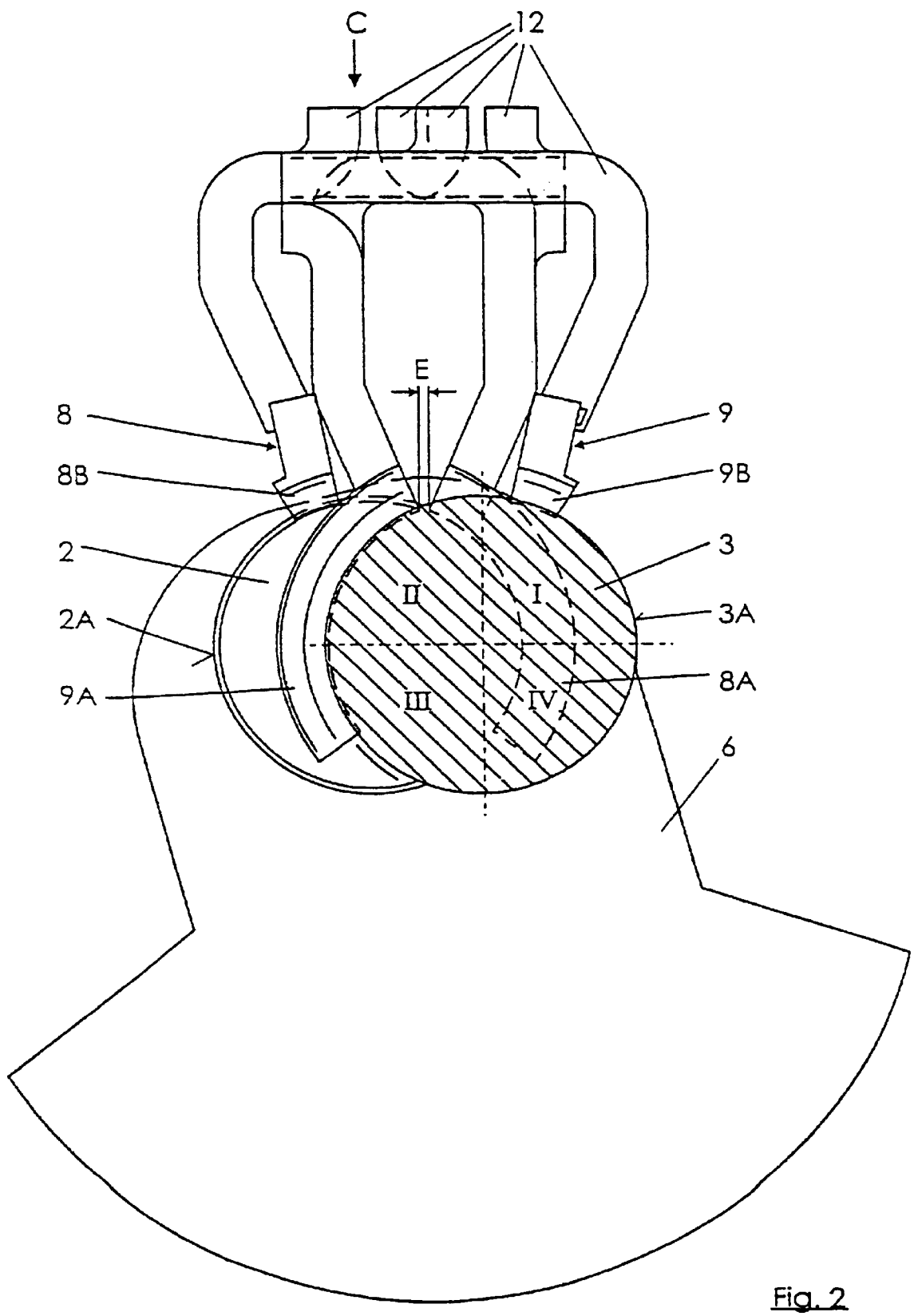
FIG. 2 shows a cross section through the crankshaft according to FIG. 1 along the line of intersection A—A of FIG. 1.

For the simultaneous electro-inductive hardening of the bearing surfaces 2A, 3A and the radii bounding them, inductors 8, 9 are provided, respectively arranged in an inductor housing 7A, 7B and with inductor portions 8A, 8B, 9A, 9B formed as heating loops, the curvature of which corresponds to the curvature of the bearing surfaces 2A, 3A and which are placed onto a respective one of the lifting pins 2, 3 from the same direction, which can be seen by an arrow C in FIG. 2.

Figure 1:
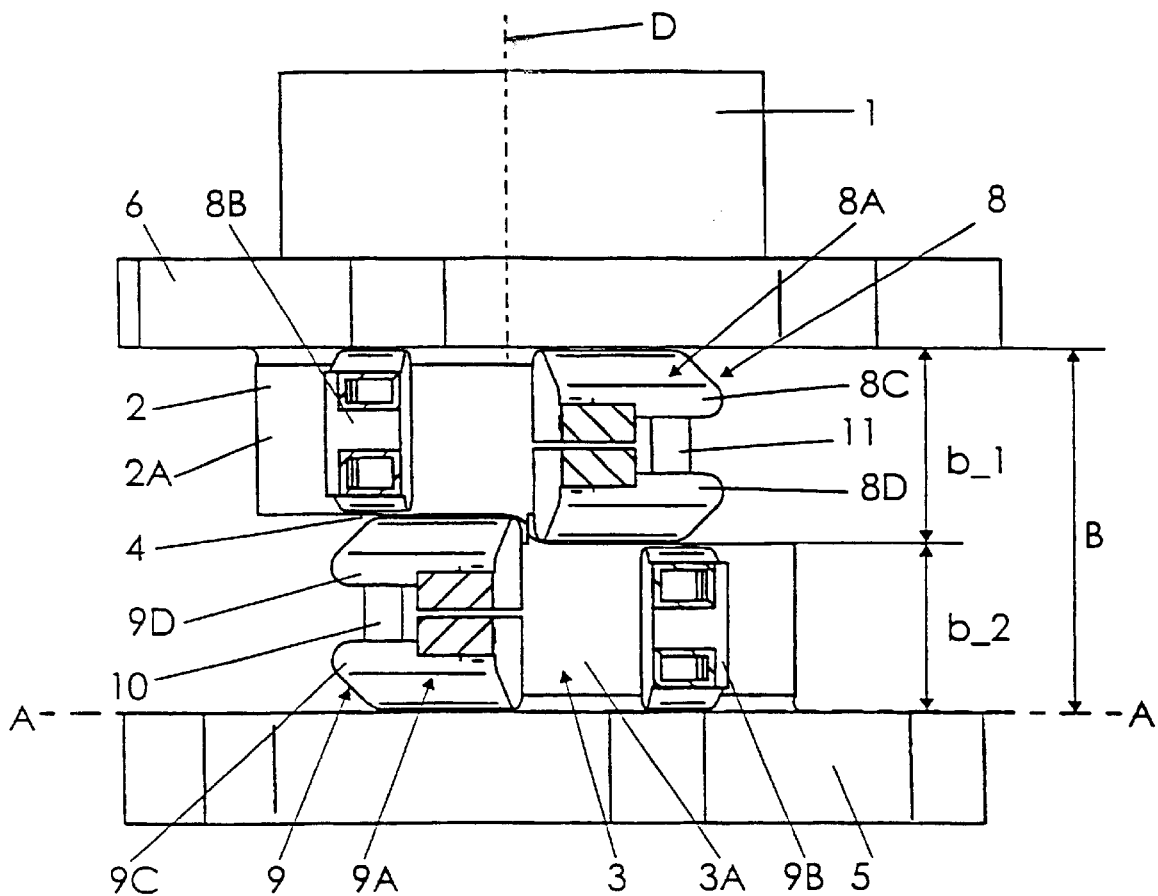
FIG. 1 shows a plan view in the form of a detail of a crankshaft with inductors of a device for hardening bearing surfaces and radii.
Figure 5:
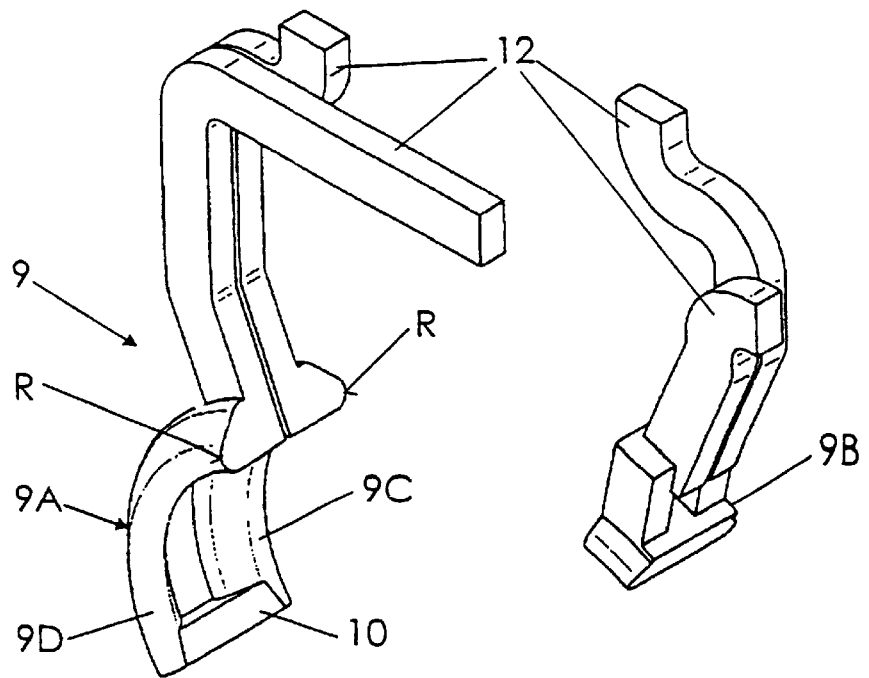
FIG. 5 shows a perspective view of an inductor of the device according to FIGS. 1 to 4.

As can be seen in particular in FIGS. 1 and 5, the inductors 8, 9 and the inductor portions 8A, 9A in each case have two inductor segments 8C, 8D and 9C, 9D arranged parallel to each other, of which in each case one inductor segment 8D and 9D is arranged in the overlapping region 4 between the lifting pins 2, 3 and the other inductor segment 8C and 9C is arranged in an outer region of the lifting pin facing the respectively adjacent web 5, 6.

The heating loops in the inductors 8, 9 are divided and are made in the form of long inductor portions 8A, 9A and short inductor portions 8B, 9B. The long inductor portions 8A, 9A are designed in such a way that they have a width $b\_1$ which is greater than half the total width B of the bearing surfaces 2A, 3A.

Since the inductors 8, 9 overlap each other in the axial direction of the crankshaft 1, the short inductor portions 8B, 9B are designed with a width $b\_2$ such that during crankshaft rotation they are narrow enough to slide past even the long inductor portions 8A, 9A with the width $b\_2$ without contact, so that a collision with a possible short-circuit can be ruled out.

The long inductor portions 8A, 9A, which cover one of the upper quadrants I, II of the lifting pin periphery through at least 50°, in the present exemplary embodiment through 65°, and the adjoining lower quadrant III or IV through at least 30°, in the configuration according to FIGS. 1 to 5 through 40°, always have in the peripheral direction of the crankshaft 1 a spacing E with respect to one another which in another configuration (not represented) may also be infinitesimally small.

This arrangement makes it possible for the long inductor portions 8A, 9A to be configured with a length with which the lifting pins 2, 3 are respectively wrapped around by an angle of wrap of 105°.

It can be seen in FIGS. 1 and 5 that the inductor segments 8C, 8D, 9C, 9D are designed in the region of the long inductor portions 8A, 9A respectively as radius hardeners with a lateral outer radius R and are connected to each other at their free end for power conduction by a connection 10, 11 designed as a surface hardener.

While the long inductor portions 8A, 9A consequently serve essentially for hardening radii, the short inductor portions 8B, 9B are designed as surface hardeners.

The dimensioning and shaping of the inductor segments 8C, 8D, 9C, 9D, in particular with regard to their length, results from the respective heating-up conditions and the way in which the crankshaft is structurally designed and can of course be differently chosen in other exemplary embodiments.

To be able to conduct power through the inductors 8, 9 and for passing cooling water through, inductor segments 8C, 8D, 9C, 9D are connected to feeds 12, which are designed as pipes.

Figure 3:
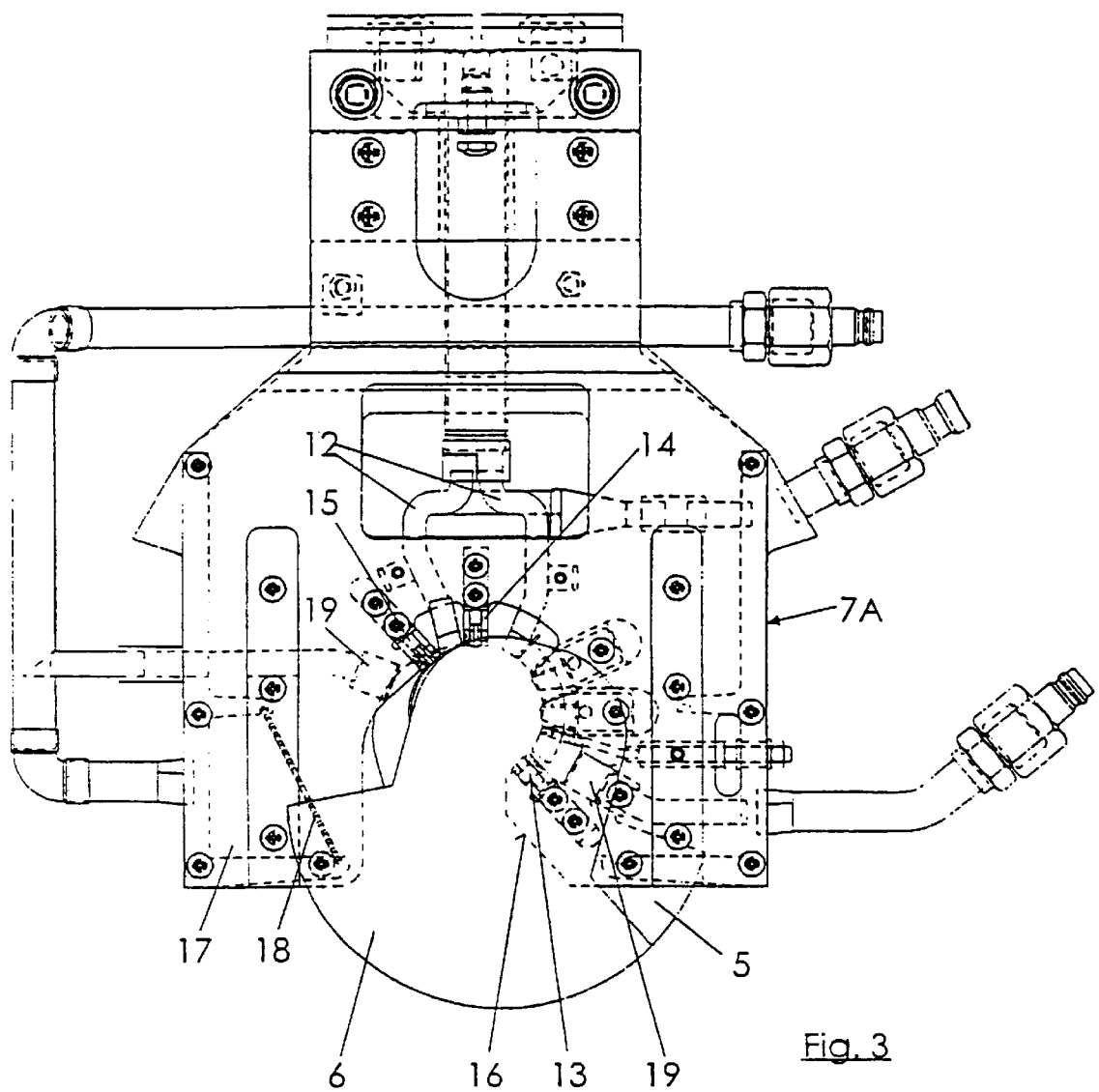
FIG. 3 shows a schematized frontal view of the device for hardening bearing surfaces and radii according to FIGS. 1 and 2.
Figure 4:
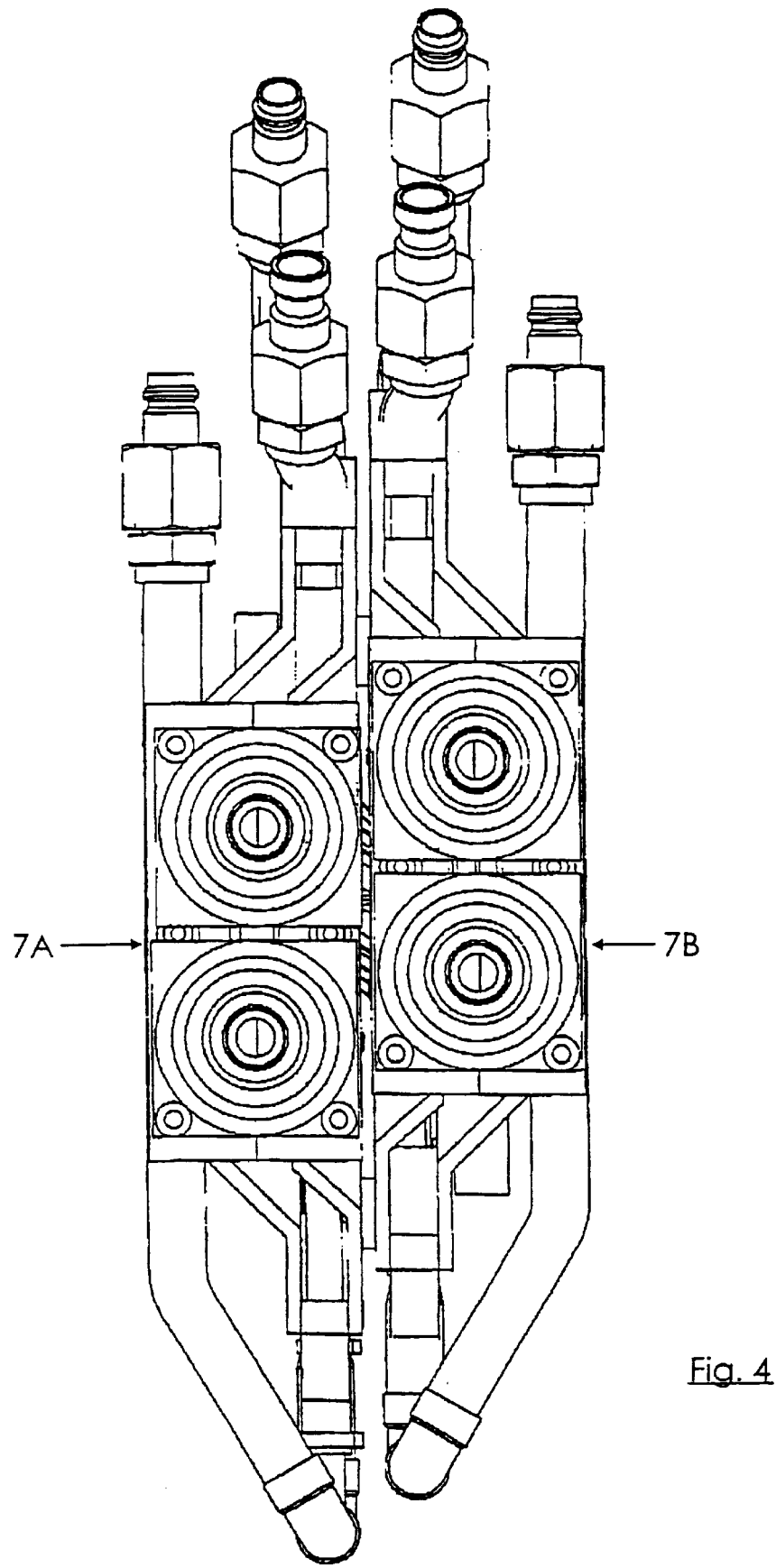
FIG. 4 shows a schematic plan view of the device for hardening bearing surfaces and radii.

With reference to FIG. 3, it can be seen that, for supporting and guiding the inductors 8, 9, three sliding shoes 13, 14, 15 are respectively provided on the lifting pins 2, 3 to be hardened, one of the sliding shoes 13, 14, 15 being respectively arranged between the inductor portions 8A, 8B and 9A, 9B as well as at the free ends of the inductor portions 8A, 8B, 9A, 9B. The sliding shoe 15 at the free end of the short inductor portion 8B, 9B is in this case arranged in the region of the bisector of the upper lifting pin quadrant I or II assigned to it and the sliding shoe 13 is arranged offset by 180° at the free end of the long inductor portion 8A, 9A.

When viewing the inductor housing 7A, likewise represented in FIG. 3, it can be seen that in its lower region there is formed a slope 16 for simple placement of the inductors 8, 9 from one direction onto the bearing surfaces 2A, 3A to be hardened of the lifting pins 2, 3.

Moreover, schematically indicated spray chambers 17, comprising a perforated plate 18 and slot sprays 19, can be seen in the lower region of the inductor housing for spraying a quenching medium onto the bearing surfaces 2A, 3A and the adjoining radii to the sides of the inductors 8, 9.

We claim:

1. A device for simultaneous peripheral electroinductive hardening of bearing surfaces and transition radii on crankshafts said crankshafts each rotatable about an axis of rotation, said device comprising lifting pins arranged directly adjacent to each other and one behind the other with different angular positions in the plane perpendicular to the axis of rotation of said crankshafts, inductors being provided, which are placed onto the lifting pins from at least approximately the same direction and which said inductors respectively assigned to a lifting pin and arranged overlapping each other in the axial direction of the crankshaft, each inductor having at least two inductor segments arranged parallel to each other, with one inductor segment of each inductor arranged in an overlapping region of the lifting pins, and the other inductor segment is arranged in an outer region of the lifting pin facing a web of the crankshaft;

each inductor including a long inductor portion and a short inductor portion, the long inductor portions partly having a width which is greater than half the total width of the bearing surfaces, and;

the long inductor portions being arranged to cover an upper quadrant of the lifting pin periphery through at least 60°;

the long inductor portions having a width which is greater than half the total width of the bearing surfaces;

the long inductor portions have a spacing with respect to one another, in the peripheral direction of the crankshaft, and;

the long inductor portions respectively covering a lower quadrant of the lifting pin periphery adjoining the upper quadrants of the lifting pin periphery through at least 30°.

2. The device as claimed in claim 1, wherein the short inductor portions have a width such that the short inductor portions are narrow enough for the long inductor portions to slide past the short inductor portions of the other inductor, respectively, without contact during rotation of the crankshaft.

3. The device as claimed in claim 1, wherein the inductor segments in the region of the long inductor portions are formed as radius hardeners connected to each other at their free end by a connection forming a surface hardener.

4. The device as claimed in claim 1, wherein the short inductor portions are formed as bearing surface hardeners.

5. The device as claimed in claim 1, wherein a sliding shoe is respectively arranged between the inductor portions and the free ends of the inductor portions, the sliding shoe at the free end of the short inductor portion being arranged at least approximately in the region of the bisector of the upper lifting pin quadrant assigned to the short inductor portion and the sliding shoe being arranged offset by at least approximately 180° in relation to the latter sliding shoe at the free end of the long inductor portion.

6. The device as claimed in claim 1, wherein an inductor housing has a slope in its lower region for placement of the housing at the inductor portions onto the bearing surfaces to harden the lifting pins.

* * * * *